US011713026B2

(12) United States Patent
Lu

(10) Patent No.: US 11,713,026 B2
(45) Date of Patent: Aug. 1, 2023

(54) TIRE BRAKE

(71) Applicant: Changyuan Lu, Guangdong (CN)

(72) Inventor: Changyuan Lu, Guangdong (CN)

( * ) Notice: Subject to any disclaimer, the term of this patent is extended or adjusted under 35 U.S.C. 154(b) by 376 days.

(21) Appl. No.: 16/916,125

(22) Filed: Jun. 30, 2020

(65) Prior Publication Data

US 2021/0362694 A1  Nov. 25, 2021

(30) Foreign Application Priority Data

May 20, 2020 (CN) .......................... 20200377039.0

(51) Int. Cl.
*B60T 3/00* (2006.01)
*F16D 49/16* (2006.01)

(52) U.S. Cl.
CPC ............... *B60T 3/00* (2013.01); *F16D 49/16* (2013.01)

(58) Field of Classification Search
CPC . B60T 1/04; B60T 3/00; B65G 69/005; F16D 49/16; F16D 49/18
USPC ................................................... 188/2 R, 74
See application file for complete search history.

(56) References Cited

U.S. PATENT DOCUMENTS

| | | | | |
|---|---|---|---|---|
| 3,760,906 A | * | 9/1973 | McGee ..................... | B60T 1/04 188/4 R |
| 4,828,076 A | * | 5/1989 | Fox ........................... | B60T 3/00 188/4 R |
| 4,934,489 A | * | 6/1990 | Jackson .................... | B60T 3/00 188/74 |
| D347,821 S | * | 6/1994 | Few ........................... | D12/217 |
| 5,392,880 A | * | 2/1995 | Christian .................. | B60T 3/00 188/32 |
| 5,490,582 A | * | 2/1996 | Trowbridge .............. | B60T 3/00 188/74 |
| 8,365,875 B2 | * | 2/2013 | Garceau .................... | B60T 1/04 254/122 |
| 9,610,924 B1 | * | 4/2017 | Searer ........................ | B60T 3/00 |
| 2002/0096402 A1 | * | 7/2002 | Tallman .................. | B60P 3/075 188/4 R |

FOREIGN PATENT DOCUMENTS

| | | | | |
|---|---|---|---|---|
| CN | 109927688 | A | * | 6/2019 |
| CN | 113370947 | A | * | 9/2021 |
| CN | 113370947 | B | * | 5/2022 |

\* cited by examiner

*Primary Examiner* — Thomas J Williams

(57) ABSTRACT

A tire brake comprising: a central shaft, a groove is formed in the middle of the surface of the central shaft, a hexagonal rotating block is embedded and arranged in the groove, and half screw rods are embedded both above and below the hexagonal rotating block through screw rod seats, one top end of the upper half screw rod is provided with an upper bearing bracket, one bottom end of the lower half screw rod is provided with a lower bearing bracket; the invention is scientific and reasonable, safe and convenient to use, in operation, the hexagonal rotating block can be directly rotated, and the hexagonal rotating block can be used to drive the half screw rod to rotate, thereby the screw rod seats driving the half screw rods to move up and down.

8 Claims, 6 Drawing Sheets

TIRE BRAKE

BACKGROUND OF THE INVENTION

1. Field of the Invention

The invention relates to technical field of automobile, in particular to a tire break.

2. Description of the Related Art

The break is a device with functions of making moving parts (moving machinery) to slow down, stop or keep the stop status, and is a machinery device that makes the moving parts to stop or slow down, which is also called stopper or skid, and a break generally comprises brake bracket, break components and operating control, and some breaks are also provided with automatic adjustment devices for clearance between brake components to reduce braking torque and structural dimensions, the breaks are generally arranged on the high-speed shaft of the device, however, for the large-scale equipment with high safety requirements (such as mine hoist, elevator, etc.), the breaks should be arranged on the low-speed shaft near the working part of the equipment;

However, the tire brakes on the market are not only complicated in structure, but also cumbersome in operation, which may cause instability, inconvenience and unsafety in outside use.

SUMMARY OF THE INVENTION

The invention provides a tire break, which can efficiently solve the problems that the tire brakes in the prior art are not only complicated in structure, but also cumbersome in operation, which may cause instability, inconvenience and unsafety in outside use.

In order to achieve above objectives, the invention provides the following technical schemes: a tire break, comprising a central shaft, a groove is formed in the middle of the surface of the central shaft, a hexagonal rotating block is embedded and arranged in the groove, and half screw rods are embedded both above and below the hexagonal rotating block through screw rod seats;

One top end of the upper half screw rod is provided with an upper bearing bracket, one bottom end of the lower half screw rod is provided with a lower bearing bracket;

Both front and rear end face of the lower bearing bracket and the upper bearing bracket are connected to an arc-shaped support piece through a rotating bolt sleeve, both front and rear end face of the central shaft are connected to a lateral support piece through a rotating bolt sleeve, and middle portion of the lateral support piece and one bottom end of the arc-shaped support piece are flexibly connected through a rotating bolt sleeve;

Bottom end of the two lateral support pieces are flexibly connected to a brake pad through a rotating shaft.

According to above technical scheme, a handle is arranged on surface of the upper bearing bracket through a rotating bolt sleeve, the handle is L-shaped.

According to above technical scheme, multiple bumps are arranged on surface of the brake pad, the bumps are arranged in formation.

According to above technical scheme, the back of the central shaft is curved, and the groove can accommodate the space of a thumb and an index finger.

According to above technical scheme, one end with thread of the half screw rod is connected to the screw rod seat, and one end without thread of the half screw rod is connected to the lower bearing bracket and the upper bearing bracket.

According to above technical scheme, the brake pad is arc-shaped.

According to above technical scheme, the diameter of the upper half screw rod is greater than that of the lower half screw rod, a hollow groove is provided inside the upper half screw rod (5), and the outer diameter of the lower half screw rod (5) is equal to the inner diameter of the hollow groove (15).

According to above technical scheme, the thread direction on the upper half screw rod is opposite to the thread direction on the lower half screw rod.

Compared to the prior art, the advantageous effects of the invention are as follows: the structure of the invention is scientific and reasonable, safe and convenient to use, in operation, the hexagonal rotating block can be directly rotated, and the hexagonal rotating block can be used to drive the half screw rod to rotate, thereby the screw rod seats driving the half screw rods to move up and down, during the stretching and extension, the half screw rods drive the lateral support pieces to become more and more parallel, and under the support of the arc-shaped support piece, a triangular fixation is formed with the half screw rod, which improves the stability, moreover, the four brake pads are in contact with and fixed to the car tires on both sides to prevent the tires from rolling, and thereafter rotating the hexagonal rotating block in the opposite direction can remove the brake pads and the tire, which is convenient and reliable, and the diameter of the upper half screw rod is larger than the diameter of the lower half screw rod, a hollow groove is provided inside the upper half screw rod, and the outer diameter of the lower half screw rod is equal to the inner diameter of the hollow groove, thereby the lower half screw rod can be embedded in the hollow groove of the upper half screw rod to save floor space.

BRIEF DESCRIPTION OF THE DRAWINGS

The accompanying drawings are used to provide a further understanding of the invention, and constitute a part of the specification, together with the embodiments of the invention are used to explain the invention, and do not constitute a limitation of the invention.

In the accompanying drawings.

In the accompanying drawings: 1 refers to central shaft, 2 refers to groove, 3 refers to hexagonal rotating block, 4 refers to screw rod seat, 5 refers to half screw rod, 6 refers to lower bearing bracket, 7 refers to upper bearing bracket, 8 refers to arc-shaped support piece, 9 refers to lateral support piece, 10 refers to rotating bolt sleeve, 11 refers to handle, 12 refers to rotating shaft, 13 refers to brake pad, 14 refers to bump, 15 refers to hollow groove.

DETAILED DESCRIPTION OF THE PREFERRED EMBODIMENTS

The preferred embodiments of the invention are described below with reference to the accompanying drawings, and it should be understood that the preferred embodiments described herein are only used to illustrate and explain the invention, but not to limit the invention.

Figure 1:
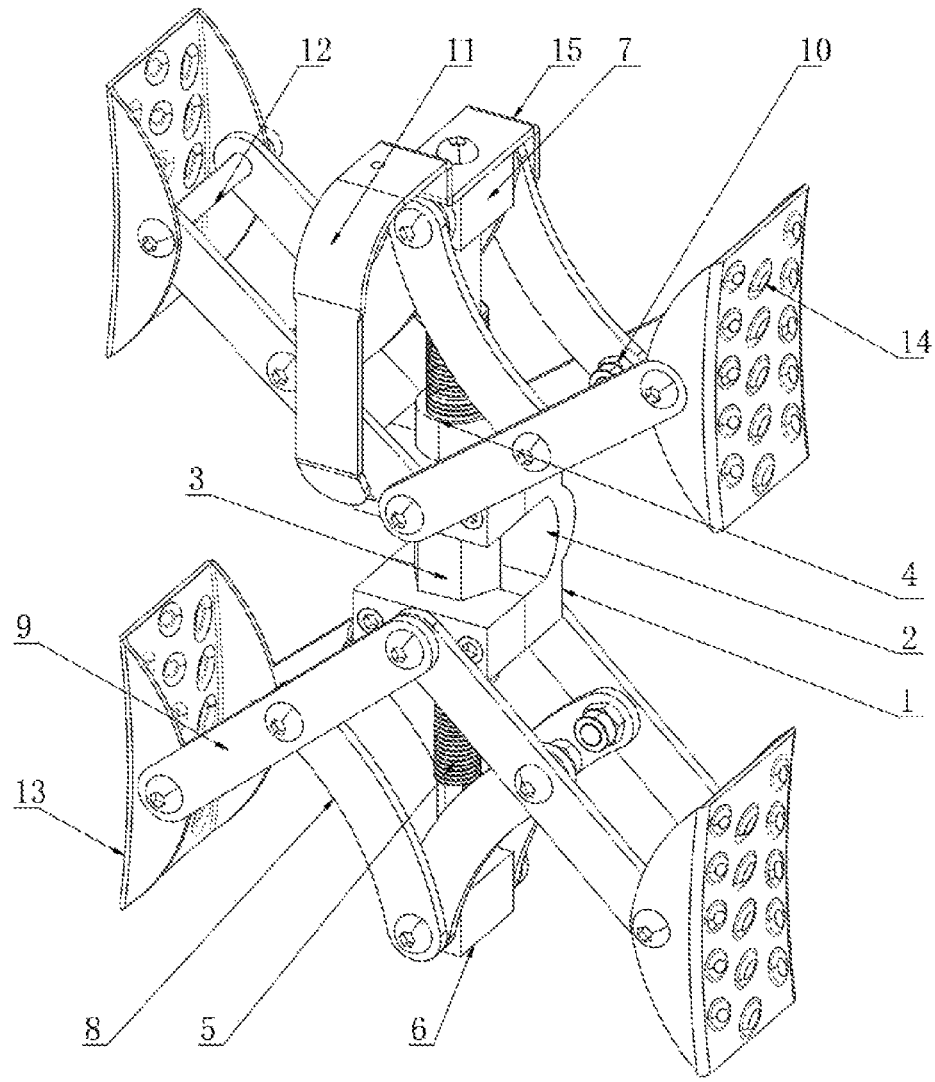
FIG. 1 shows space structure of the invention.
Figure 2:
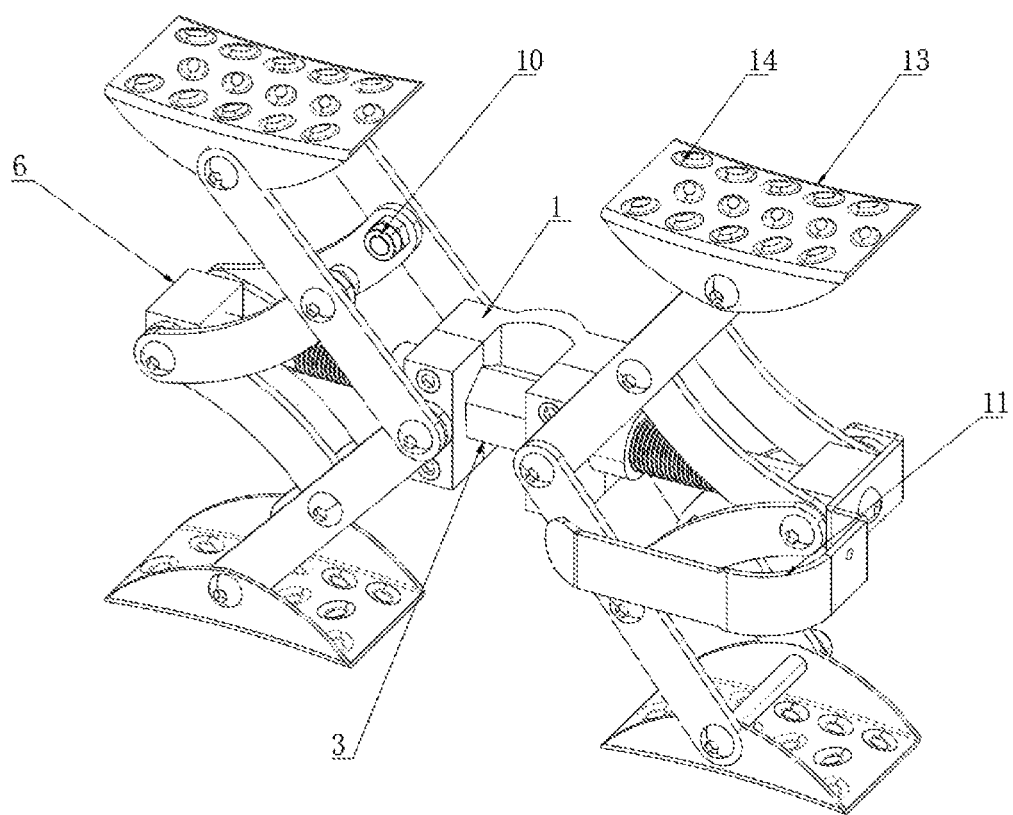
FIG. 2 shows horizontal space structure of the invention.
Figure 3:
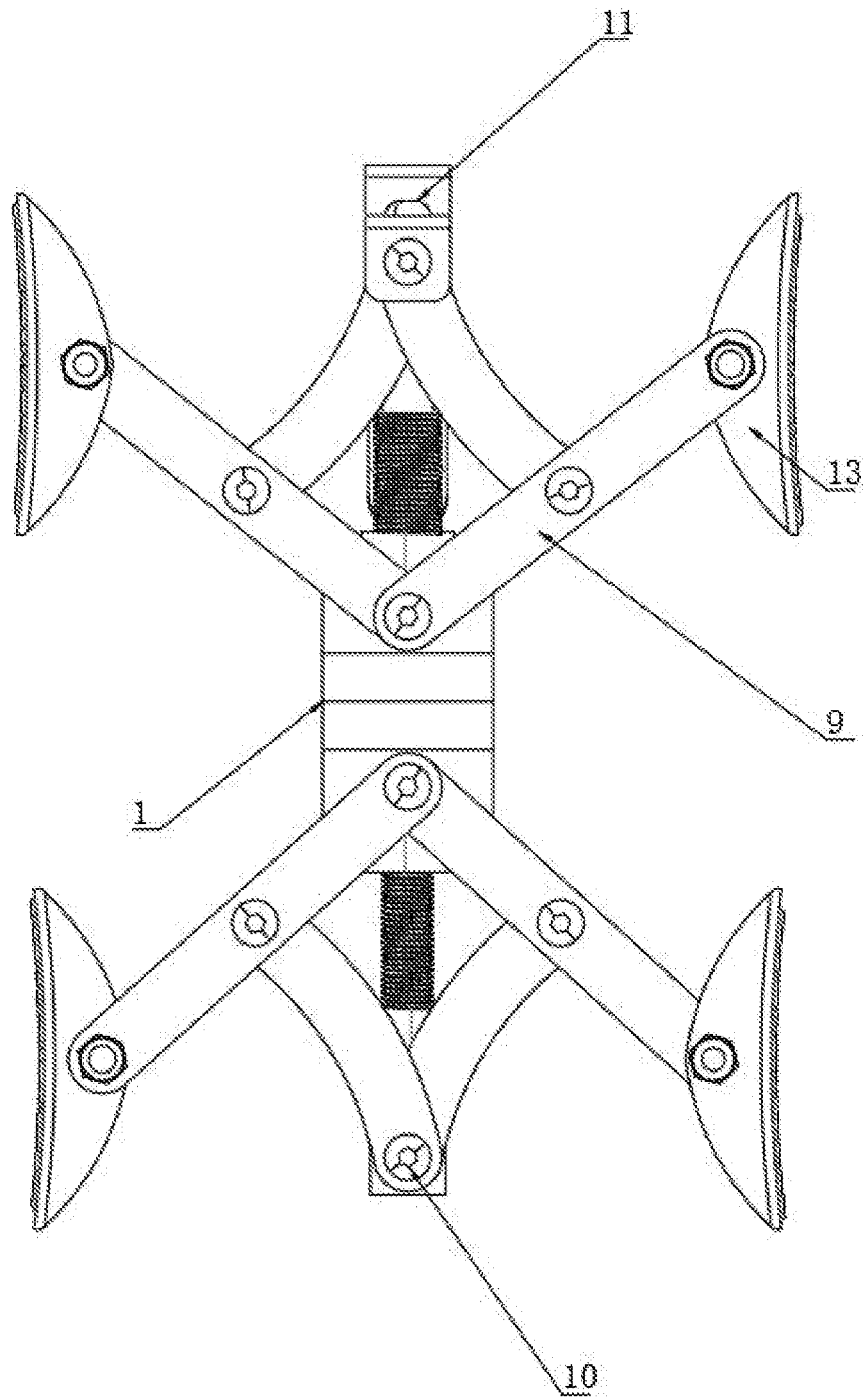
FIG. 3 shows the structure in top view of the invention.
Figure 4:
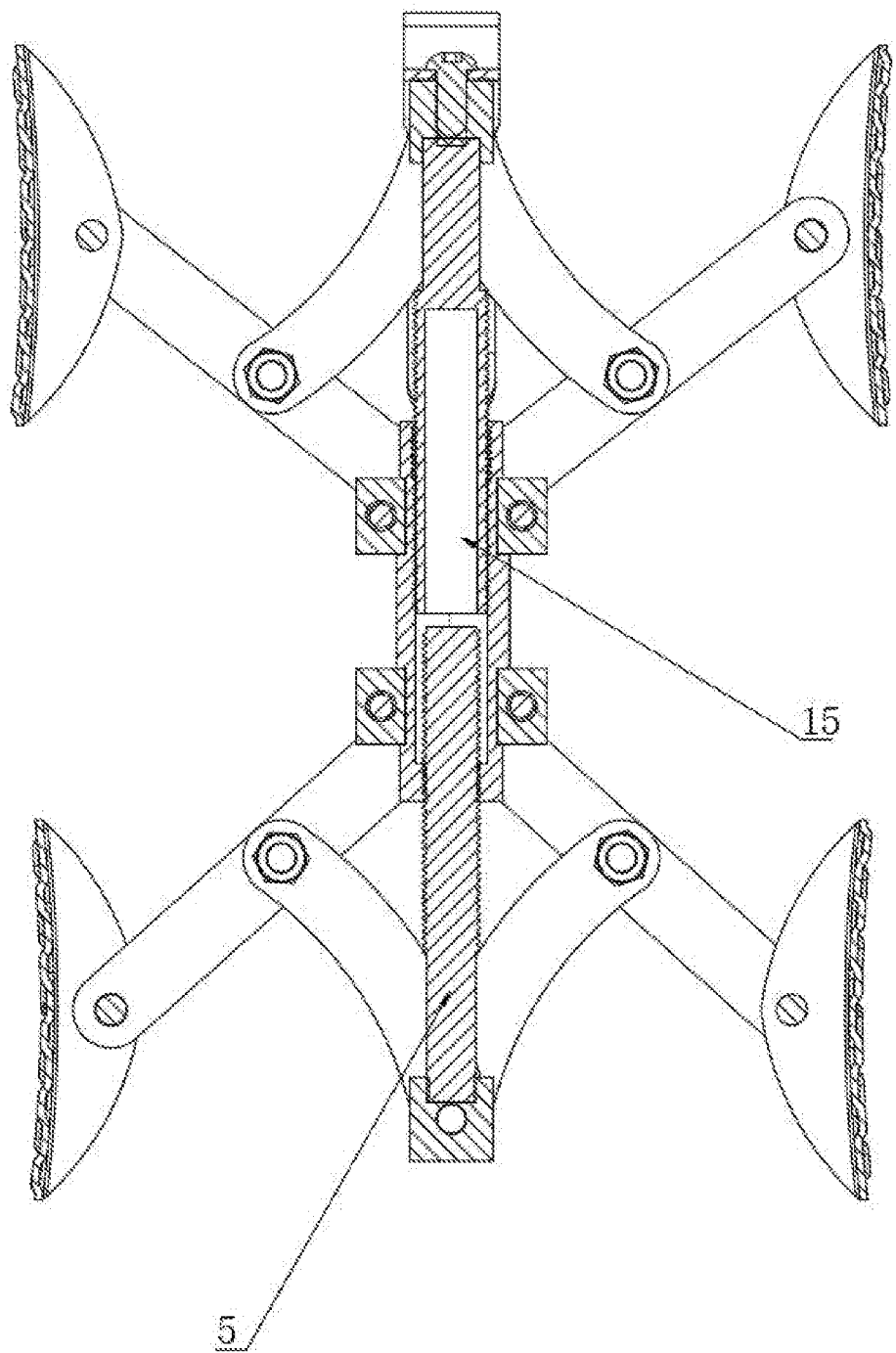
FIG. 4 shows the structure in section view of the invention.
Figure 5:
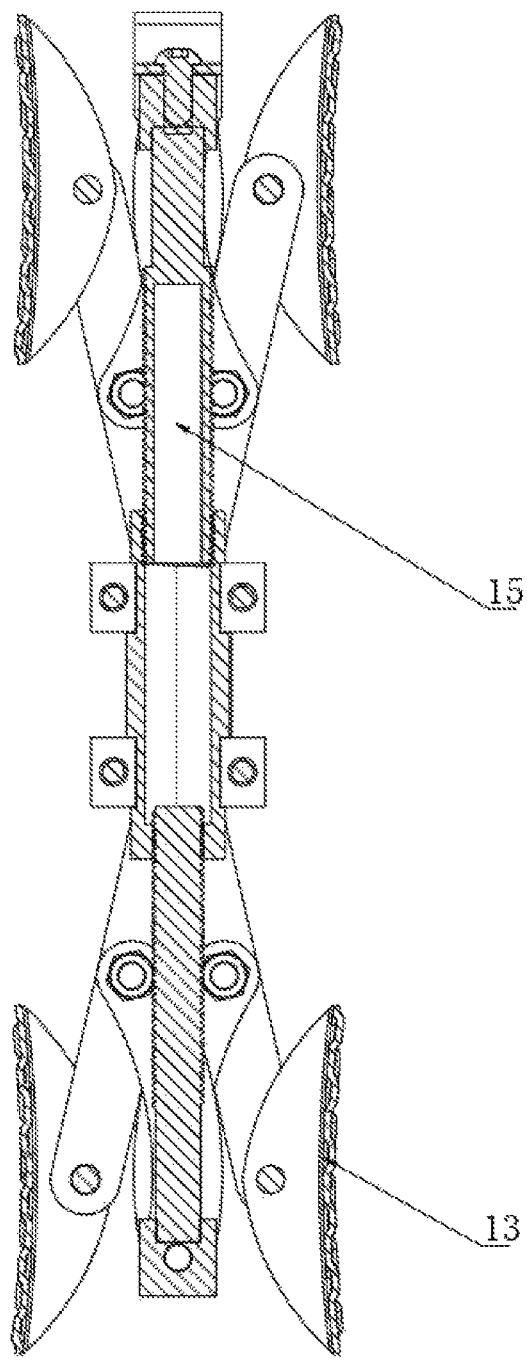
FIG. 5 shows the structure in section view of upper and lower screw rod seat in opened status of the invention.
Figure 6:
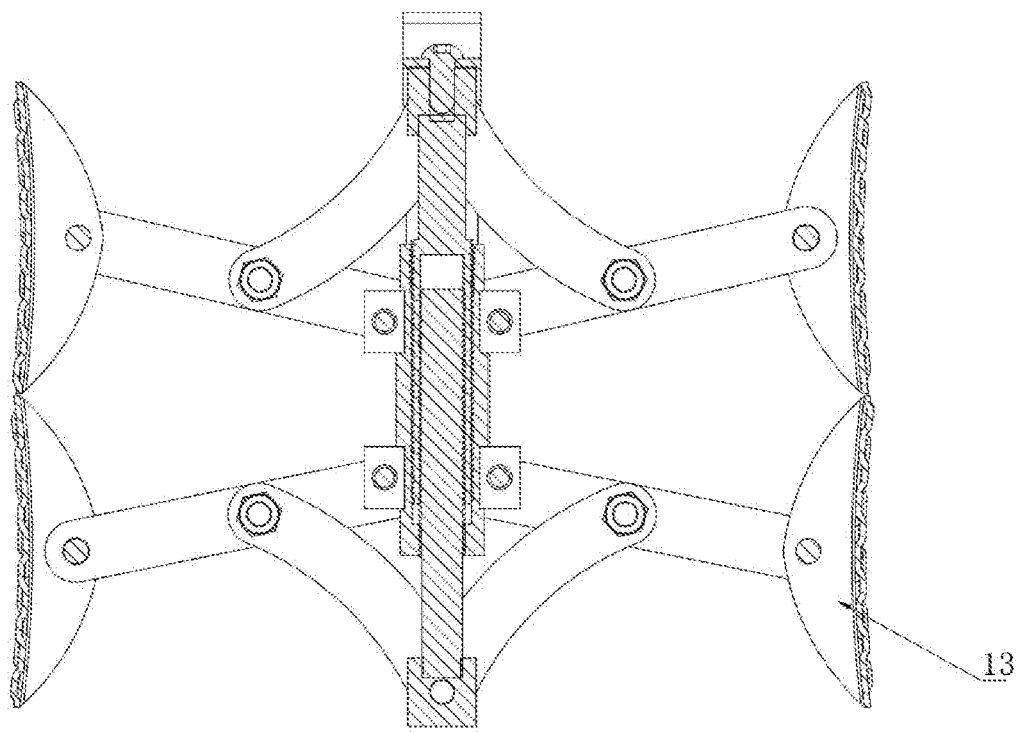
FIG. 6 shows the structure in section view of upper and lower screw rod seat in closed status of the invention.

Embodiment: as shown in FIG. 1-6, the invention provides the following technical scheme, a tire brake, comprising a central shaft 1, a groove 2 is formed in the middle of the surface of the central shaft 1, a hexagonal rotating block 3 is embedded and arranged in the groove 2, the back of the central shaft 1 is curved, and the groove 2 can accommodate the space of a thumb and an index finger, which facilitates operator to manually rotate the hexagonal rotating block 3, half screw rods 5 are embedded both above and below the hexagonal rotating block 3 through screw rod seats 4, and one end with thread of the half screw rod 5 is connected to the screw rod seat 4, and one end without thread of the half screw rod 5 is connected to the lower bearing bracket 6 and the upper bearing bracket 7, which is convenient for normal installation and rotation, and the thread direction on the upper half screw rod 5 is opposite to the thread direction on the lower half screw rod 5, which is convenient for lifting and stretching;

The diameter of the upper half screw rod 5 is greater than that of the lower half screw rod 5, a hollow groove 15 is provided inside the upper half screw rod 5, and the outer diameter of the lower half screw rod 5 is equal to the inner diameter of the hollow groove 15, and the lower half screw rod can be embedded in the hollow groove of the upper half screw rod, thereby saving floor space.

One top end of the upper half screw rod 5 is provided with an upper bearing bracket 7, a handle 11 is arranged on surface of the upper bearing bracket 7 through a rotating bolt sleeve 10, the handle 11 is L-shaped, which is convenient for normal installation and taking of the brake, convenient and reliable, and the lower bearing seat 6 is installed at the bottom of the lower half screw 5, one bottom end of the lower half screw rod 85 is provided with a lower bearing bracket 6;

Both front and rear end face of the lower bearing bracket 6 and the upper bearing bracket 7 are connected to an arc-shaped support piece 8 through a rotating bolt sleeve 10, both front and rear end face of the central shaft 1 are connected to a lateral support piece 9 through a rotating bolt sleeve 10, and middle portion of the lateral support piece 9 and one bottom end of the arc-shaped support piece 8 are flexibly connected through a rotating bolt sleeve 10;

Bottom end of the two lateral support pieces 9 are flexibly connected to a brake pad 13 through a rotating shaft 12, the brake pad 13 is arc-shaped to facilitate better fitting, and multiple bumps 14 are arranged on surface of the brake pad 13, the bumps 14 are arranged in formation, thereby the brake pads 13 can better contact with the tire and increase the contact force on the surface.

The working flow and use flow of the invention are that: the structure of the invention is scientific and reasonable, safe and convenient to use, in operation, first compare the distance between the break pad 13 of the break and the tire, and directly rotating the hexagonal rotating block 3, the hexagonal rotating block 3 can drive the half screw rod 5 to rotate, thereby the screw rod seats 4 driving the half screw rods 5 to move up and down under the action of rotation, during the stretching and extension, the half screw rods 5 drive the lateral support pieces 9 to become more and more parallel, and under the support of the arc-shaped support piece 8, a triangular fixation is formed with the half screw rod 5, which improves the stability, moreover, the four brake pads 13 are in contact with and fixed to the car tires on both sides to prevent the tires from rolling, and thereafter rotating the hexagonal rotating block 3 in the opposite direction can remove the brake pads and the tire, which is convenient and reliable, and suitable for popularization, thereby solving the problems of complicated operation in the market.

Finally, it should be noted that the foregoing is only a preferred embodiment of the invention and is not intended to limit the invention, although the invention has been described in detail with reference to the above embodiments, the technical schemes described in the foregoing embodiments can be modified, or some of the technical features can be equivalently replaced. Any modification, equivalent replacement, improvement, etc. made within the spirit and principle of the invention shall be included in the protection scope of the invention.

The invention claimed is:

1. A tire brake comprising: a central shaft (1), a groove (2) is formed in middle of a surface of the central shaft (1), a hexagonal rotating block (3) is embedded and arranged in the groove (2), and half screw rods (5) are embedded both above and below the hexagonal rotating block (3) through screw rod seats (4);
   one top end of an upper half screw rod (5) is provided with an upper bearing bracket (7), one bottom end of a lower half screw rod (5) is provided with a lower bearing bracket (6);
   both front and rear end face of the lower bearing bracket (6) and the upper bearing bracket (7) are connected to an arc-shaped support piece (8) through a rotating bolt sleeves (10), both front and rear end face of the central shaft (1) are connected to a lateral support piece (9) through the rotating bolt sleeves (10), and middle portion of the lateral support piece (9) and one bottom end of the arc-shaped support piece (8) are flexibly connected through the rotating bolt sleeves (10);
   bottom end of the two lateral support pieces (9) are flexibly connected to a brake pad (13) through a rotating shaft (12).

2. The tire brake of claim 1, wherein a handle (11) is arranged on surface of the upper bearing bracket (7) through the rotating bolt sleeves (10), the handle (11) is L-shaped.

3. The tire brake of claim 1, wherein multiple bumps (14) are arranged on surface of the brake pad (13), the bumps (14) are arranged in formation.

4. The tire brake of claim 1, wherein back of the central shaft (1) is curved.

5. The tire brake of claim 1, wherein one end with thread of the half screw rod (5) is connected to the screw rod seat (4), and one end without thread of the half screw rod (5) is connected to the lower bearing bracket (6) and the upper bearing bracket (7).

6. The tire brake of claim 1, wherein the brake pad (13) is arc-shaped.

7. The tire brake of claim 1, wherein the diameter of the upper half screw rod (5) is greater than that of the lower half screw rod (5), a hollow groove (15) is provided inside the upper half screw rod (5), and the outer diameter of the lower half screw rod (5) is equal to the inner diameter of the hollow groove (15).

8. The tire brake of claim 7, wherein the thread direction on the upper half screw rod (5) is opposite to the thread direction on the lower half screw rod (5).

* * * * *